United States Patent
Dong et al.

(10) Patent No.: US 6,434,496 B1
(45) Date of Patent: Aug. 13, 2002

(54) METHOD AND APPARATUS FOR MEASURING LIGHT ABSORPTION SPECTRA

(75) Inventors: Jie Dong; Koh Matsumoto, both of Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/472,411

(22) Filed: Dec. 27, 1999

(30) Foreign Application Priority Data

Dec. 28, 1998 (JP) .......................................... 10-374296

(51) Int. Cl.⁷ .............................................. G01R 23/16
(52) U.S. Cl. ........................ 702/77; 702/191; 324/76.21
(58) Field of Search ........................... 702/77, 191, 69; 324/76.21, 639, 96; 382/280; 708/403; 250/339.08

(56) References Cited

U.S. PATENT DOCUMENTS

| | | | | |
|---|---|---|---|---|
| 4,645,300 A | * | 2/1987 | Brandstetter et al. | 350/162.12 |
| 4,699,466 A | * | 10/1987 | Brandstetter et al. | 350/162.12 |
| 4,828,388 A | * | 5/1989 | Namba | 256/336 |
| 5,005,946 A | * | 4/1991 | Brandstetter | 350/162.12 |
| 5,166,749 A | * | 11/1992 | Curbelo et al. | 356/346 |
| 5,612,784 A | * | 3/1997 | Curbelo | 356/346 |
| 6,020,962 A | * | 2/2000 | Curbelo | 356/340 |
| 6,043,884 A | * | 3/2000 | Curbelo | 356/346 |
| 6,054,711 A | * | 4/2000 | Bruening et al. | 230/339.08 |

OTHER PUBLICATIONS

Musyakkov, Uzhov, Yastrebov, 1983, "Investigating Vibration of Objects with Diffuse–Reflecting Surfaces".*

* cited by examiner

Primary Examiner—Marc S. Hoff
Assistant Examiner—Paul L Kim
(74) Attorney, Agent, or Firm—Merchant & Gould P.C.

(57) ABSTRACT

The present invention provides a method and an apparatus for measuring a light absorption spectra which can remove a noise included in a measurement signal, and achieve a high sensitivity of a laser spectral in a good S/N ratio. According to the present invention, there is provided a method for measuring a light absorption spectra comprising the steps of: (i) conducting a Fourier transform of an absorption spectra measured by using a laser beam source; (ii) disassembling in a Fourier space the Fourier transformed signal into a signal resulted from a periodic vibration component and a signal resulted from a molecular absorption spectra; (iii) removing the Fourier component resulted from said periodic vibration component in a Fourier space; and (iv) conducting an inverse Fourier transform on the signal from which said periodic vibration component is removed, whereby reproducing an absorption spectra in a real space.

3 Claims, 6 Drawing Sheets

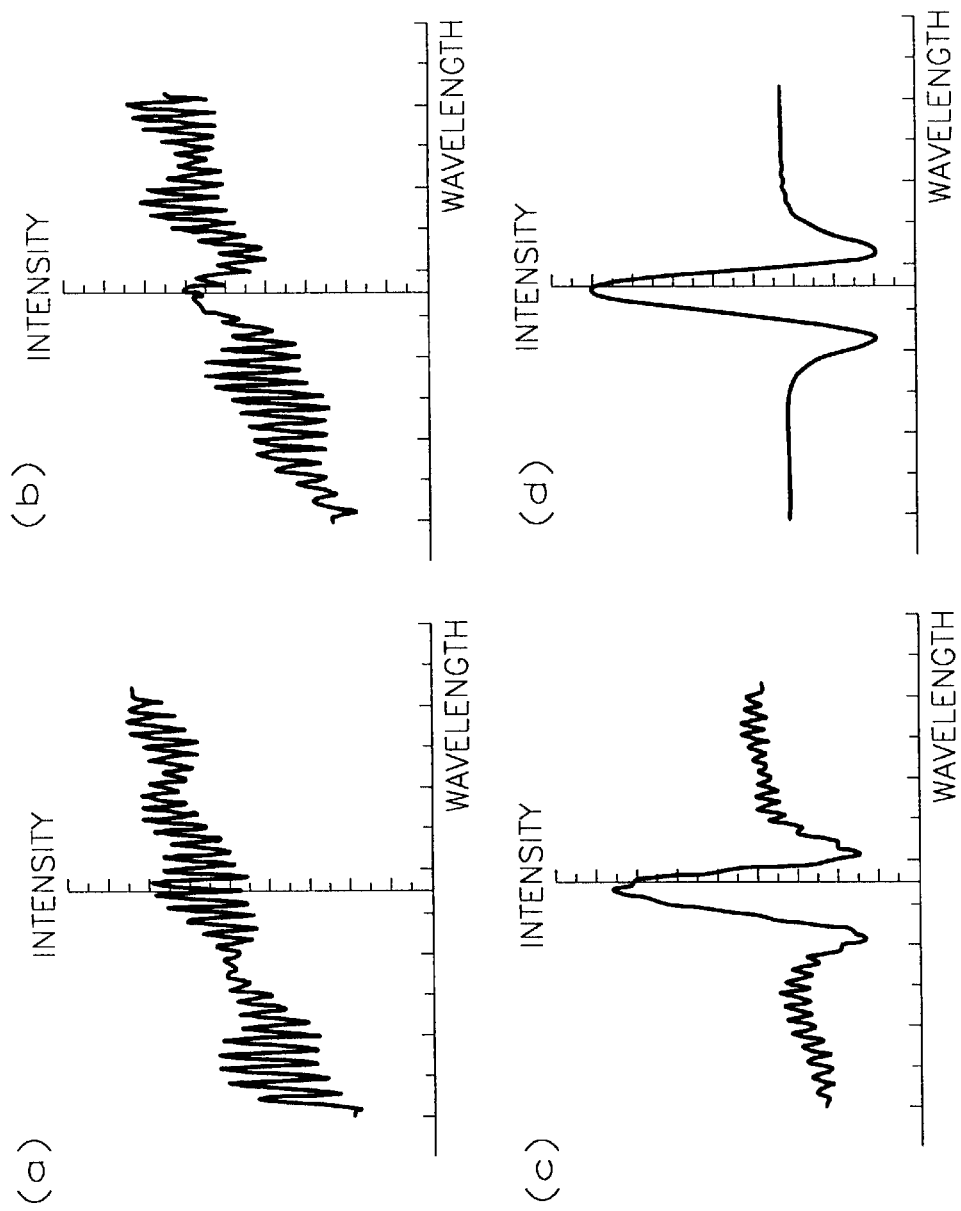

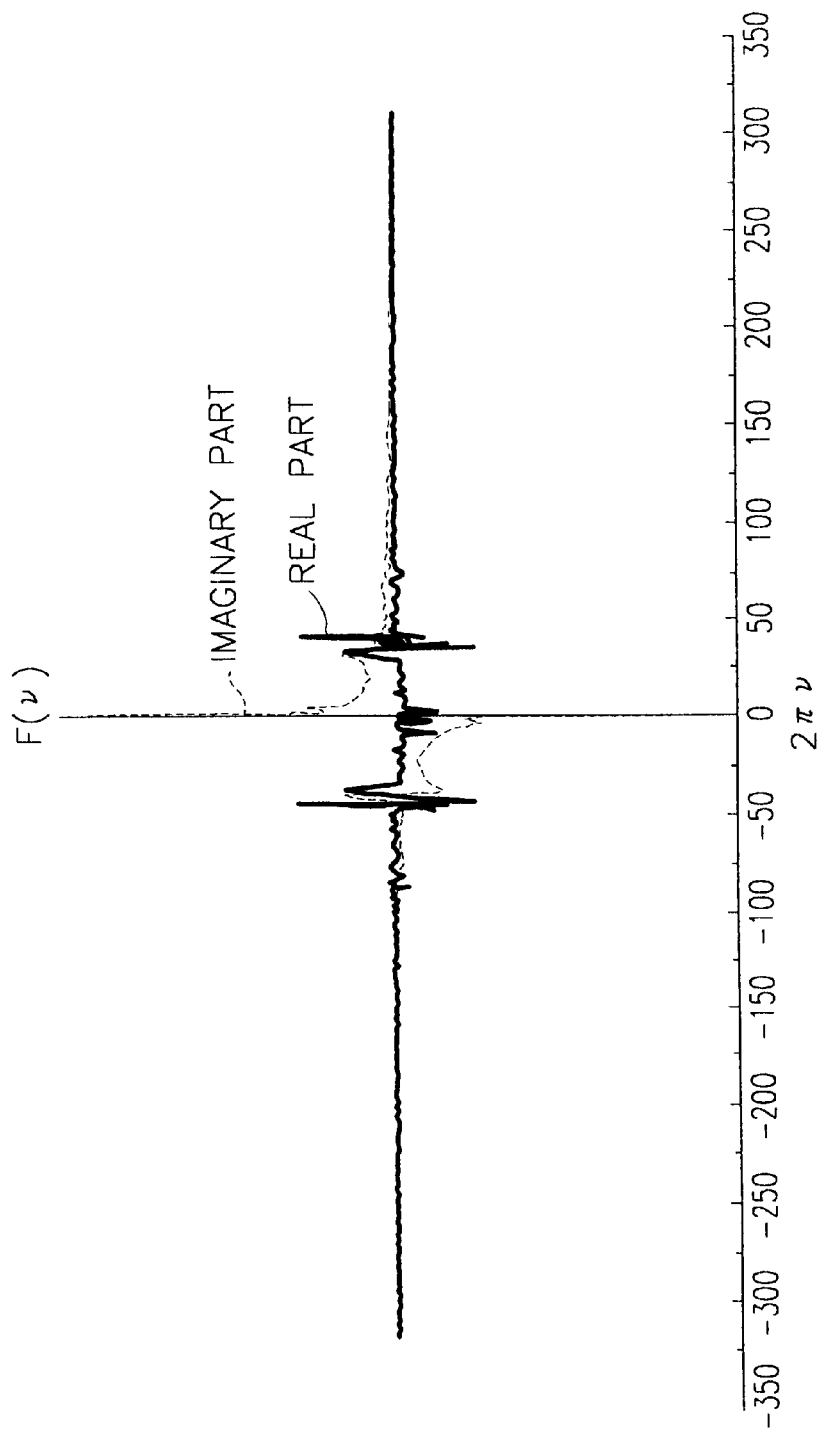

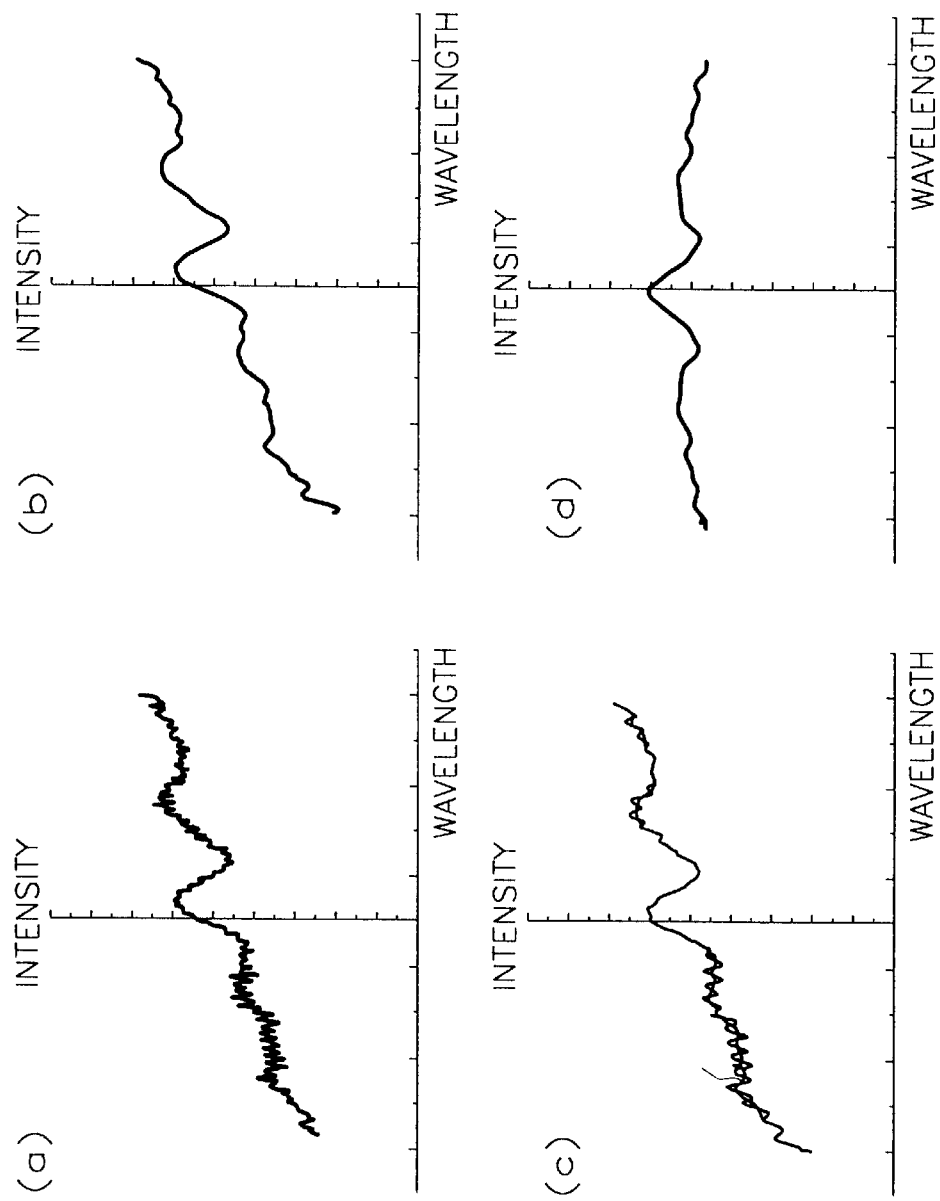

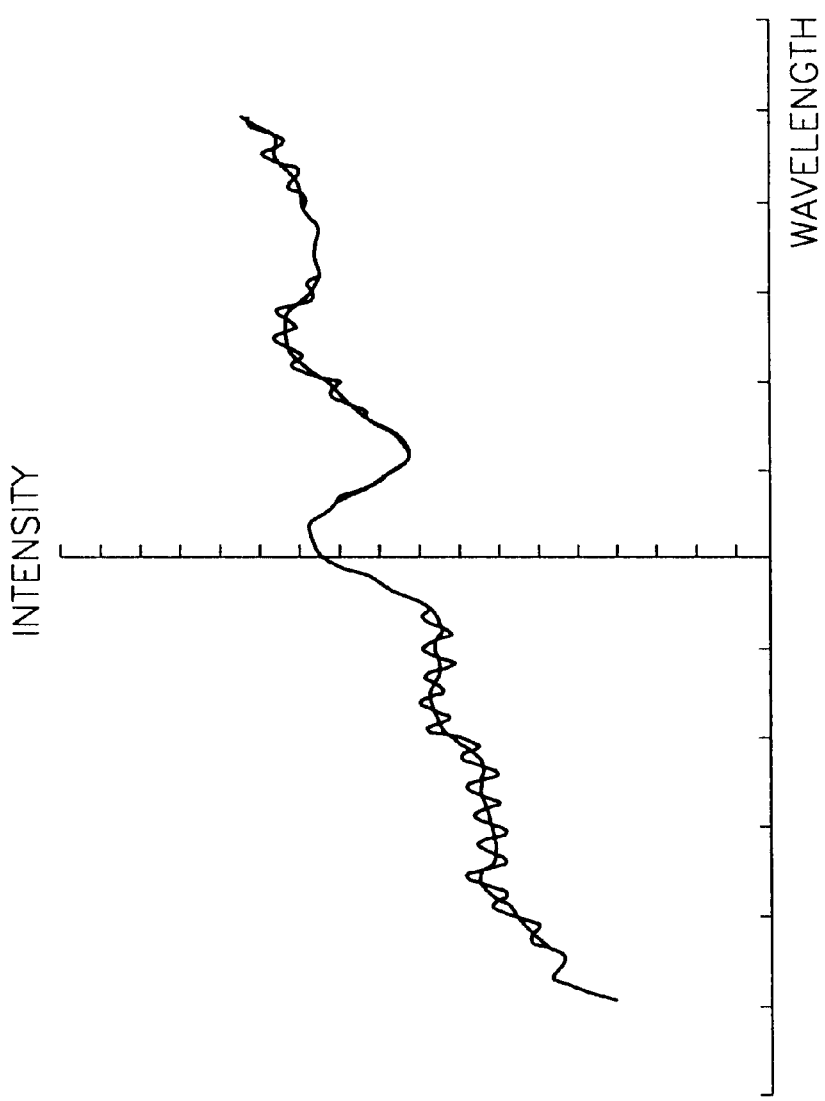

METHOD AND APPARATUS FOR MEASURING LIGHT ABSORPTION SPECTRA

TECHNICAL FIELD

The present invention relates to a method and an apparatus for measuring light absorption spectra, using laser spectra.

TECHNICAL BACKGROUND

Recently, a laser spectral technique near an infrared zone has been used for a medical diagnosis, an environmental instrumentation, a food inspection, a spectral analysis of the impurity in gas (for example, moisture in nitrogen or hydrogen chloride), a leakage detection monitor of a gas for semiconductor production, an observation of the gas concentration in a semiconductor processing apparatus and the like. The laser spectral technique is briefly described hereinafter.

The type of the atom or molecular to be measured is identified by radiating a laser beam of a certain intensity to the atom or molecular and measuring a transmittance of the laser beam at each of wavelengths of the beam.

In general, a high sensitization is one object in a laser spectral technique. In the laser spectral technique, a laser beam source is used as a light source, and the laser spectral technique has an advantage that an intensity of a measured light is extremely high when compared to a spectral technique not using a laser as a light source. Thus, it has been known as a technique providing high detection sensitivity.

However, in the conventional laser spectral technique, an interference of light can be easily occurred due to a long coherent length of the laser beam. In a measured signal obtained by a laser spectra, a number of periodic vibrations are found as an interference noise which causes an interference of light.

Such noise is resulted from the presence of weak reflection lights from the surface of various types of optical parts, for example, lens, reflector, light isolator, polarizer and the like used in the measurement system.

Accordingly, the conventional laser spectral technique has a problem that weak absorption spectra of molecular in the measurement cell cannot be identified due to an interference noise; thus, it is difficult to measure the spectra correctly. For example, the theoretical detection lower limit on an unit cell length of laser spectral for moisture in nitrogen is calculated as 5 ppb/m. However, the real, practical detection sensitivity is limited to 50 ppb/m.

As described above, since an absorption signal of impurities cannot be separated from noise signals by the influence of light interference noises in the conventional laser spectral system, a high sensitivity of the laser spectra can not be sufficiently obtained.

An object of the present invention is to eliminate the above-mentioned problem of the prior art, and to provide a method and an apparatus for measuring light absorption spectra which can remove a noise included in a detected signal and achieve a high sensitivity of a laser spectra in a good S/N ratio.

SUMMARY OF THE INVENTION

The invention provides a method for measuring a light absorption spectra characterized by comprising the steps of (i) conducting a Fourier transform of an absorption spectra measured by using a laser beam source; (ii) disassembling in a Fourier space the Fourier transformed signal into a signal resulted from a periodic vibration component and a signal resulted from a molecular absorption spectra; (iii) removing the Fourier component resulted from said periodic vibration component in a Fourier space; and (iv) conducting an inverse Fourier transform on the signal from which said periodic vibration component is removed, whereby reproducing an absorption spectra in a real space.

Further, the invention provides a method for measuring a light absorption spectra characterized by the step of conducting Fourier transform comprising (i) describing said absorption spectra measured as an even function and an odd function for which a peak position of said absorption spectra forms a symmetrical axis; and (ii) conducting Fourier transform on the even function and the odd function.

Further, the invention provides a method of measuring a light absorption spectra characterized by comprising the step of measuring quantitatively a concentration based on a peak intensity of the absorption spectra in said reproduced real space.

Further, the invention provides an apparatus characterized by using one of the above methods for measuring a light absorption spectra providing an absorption spectra from which Fourier components resulted from periodic vibration components are removed.

BRIEF DESCRIPTIONS OF THE DRAWINGS

The method and apparatus for measuring light absorption spectra according to the present invention will now be described with reference to the accompanying drawings, in which:

FIG. 4 shows a measurement result of a concentration of hydrogen chloride in nitrogen;

FIG. 5 shows a real part and an imaginary part of Fourier transform of a measurement result where hydrogen chloride is not introduced;

FIG. 6 shows Fourier transformed measurement signals from which a certain frequency component is removed where the concentration of hydrogen chloride is 1 ppm; and FIG. 7 shows a signal synthesized after components having frequency $|2\pi v|>25$ of the functions $g(x)$ and $h(x)$ are removed when hydrogen chloride is introduced at the concentration of 1 ppm.

EMBODIMENTS OF THE INVENTION

Figure 1:
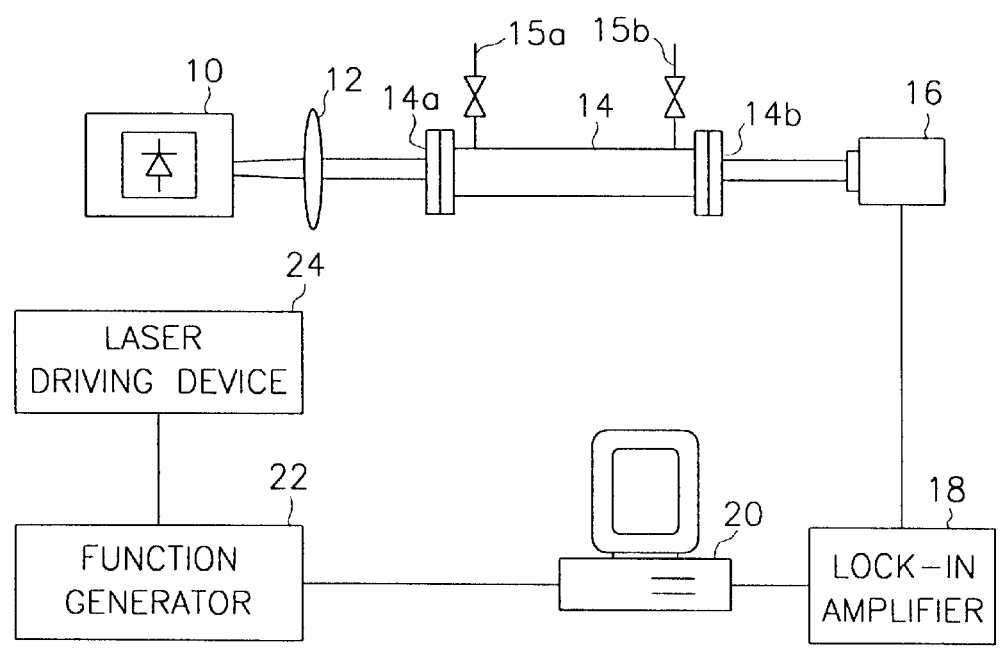
FIG. 1 is a block diagram showing a schematic structure of an apparatus for measuring light absorption spectra in accordance with the present invention.

FIG. 1 is a block diagram showing a schematic structure of an apparatus for measuring light absorption spectra in accordance with the present invention;

Referring to FIG. 1, an infrared semiconductor DFB (Distributed Feed Back) laser light source 10 emanates an infrared beam of a single longitudinal mode. A collimation lens 12 is arranged in the beam axis of the DFB laser beam source 10 and transforms the emanated infrared beam into a parallel beam. A sample gas cell 14 has an incident window 14a to allow an incidence of infrared beam and an emanation window 14b to emanate the infrared beam. The gas to be measured is introduced into and discharged out from the sample cell 14 through pipes 15a and 15b.

An infrared ray detector 16 is arranged in the side of the emanation window 14b of sample cell 14, and detects a intensity of infrared ray. The intensity of infrared ray detected in the infrared ray detector 16 is transformed to an electrical signal which inputs into lock-in amplifier 18. The lock-in amplifier 18 processes the signal from the infrared ray detector 16 and outputs only a second differential signal which is transferred to the inner part of the computer 20 in a form of digital signal.

The computer 20 controls an oscillation wavelength of DFB laser beam source 10 as described below. Further, the computer 20 remove a noise signal from a detected signal by using a method for measuring light absorption spectra according to one embodiment of the present invention.

A function generator 22 outputs a sweep signal changed with the lapse of time according to a control signal from the computer 20. Further, a laser driving device 24 controls an operation temperature and a driving current of the DFB laser beam source, and continuously sweeps an oscillation wavelength of the DFB laser beam by changing an operation temperature and a driving current according to the sweep signal from the function generator 20.

The whole procedures are now explained. First, a gas to be measured is introduced in the sample gas cell 14. The computer 20 is then operated, and outputs a control signal which makes the function generator 22 output a sweep signal. The laser driving device 24 changes an operation temperature and a driving current of the DFB laser beam source 10 according to a sweep signal from the function generator 22 to continuously change an oscillation wavelength of the DFB laser beam.

Laser beam emanated from the DFB laser beam source 10 is transformed to a parallel beam by the collimator lens 12, which is introduced into the sample gas cell 14 through the incident window 14a and emanated from the emanation window 14b. The intensity of the laser beam is then detected by the infrared ray detector 16.

When a laser beam passes through the sample gas cell 10, the beam is much absorbed in the gas cell if the wavelength of the beam is the same as the absorption wavelength of the gas introduced in the sample gas cell 14. Otherwise, the absorption is weak. Therefore, when the wavelength of laser beam from the DFB laser beam source 10 is the same as the absorption wavelength of a gas to be measured, the intensity of the laser beam detected by the infrared ray detector 16 is weak and the detected signal is weak too.

A detected signal output from the infrared ray detector 16 is transferred to the computer 20 in a form of digital signal through the lock-in amplifier 18. The computer 20 processes the signal to eliminate noise components, by using a method for measuring light absorption spectra according to one embodiment of the present invention.

Next, a method and an apparatus for measuring light absorption spectra according to one embodiment of the present invention are described in detail.

Figure 2:
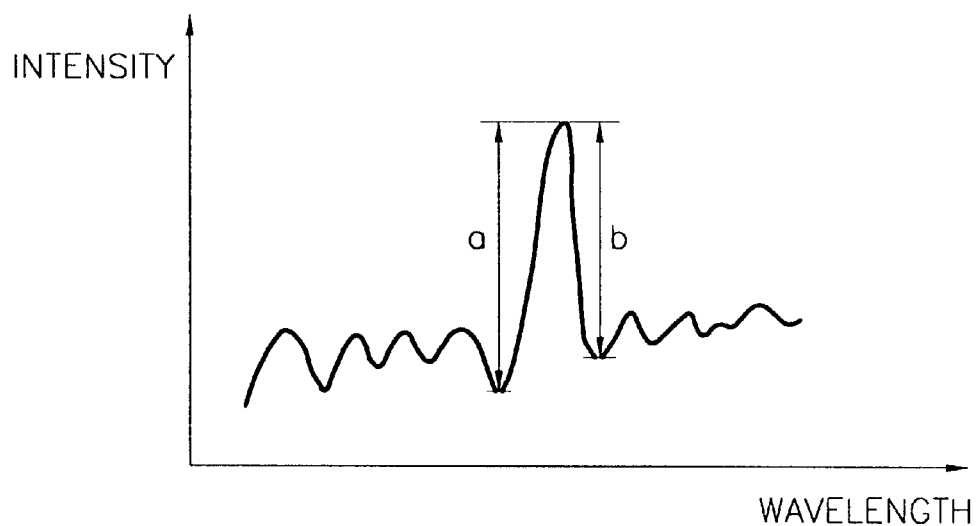
FIG. 2 is one example showing the measurement result of a gas.

FIG. 2 is one example showing the measurement result of a measured gas. In FIG. 2, the horizontal axis corresponds to a measurement wavelength and the vertical axis corresponds to intensity. As shown in FIG. 2, if a wavelength is changed, a light interference condition is changed by reflection of optical parts in the beam channel to produce a fringe noise. If such a laser beam source of a long coherent length is used as a beam source, separation of signal components (absorption signal) from noise components is difficult in case that the intensity of absorption signal is not strong. A sensitivity is limited and a reliability is damaged.

The types of gas in the sample cell 14 can be identified by an absorption wavelength detected as mentioned below, and the concentration of gas can be obtained from the intensity as shown in FIG. 2.

As shown in FIG. 2, if the differences between the peak value and the minimum values at the both sides of the peak value are established as a and b, the intensity can be obtained by calculating (a+b)/2. The gas concentration can be obtained based on the intensity obtained from this equation. When a noise component is large, a peak for the gas to be measured cannot be identified due to the noise, contrary to the clear peak value as shown in FIG. 2.

In this embodiment of the invention, a discrete Fourier transform is conducted with respect to a detected signal, and noise components are removed from the transformed signal in spectral space. The resulting, final signal will have just a little noise components. In the present embodiment, a direct method (1) and a synthesis method (2) are considered as methods for eliminating noise.

(1) Direct Method

Figure 3:
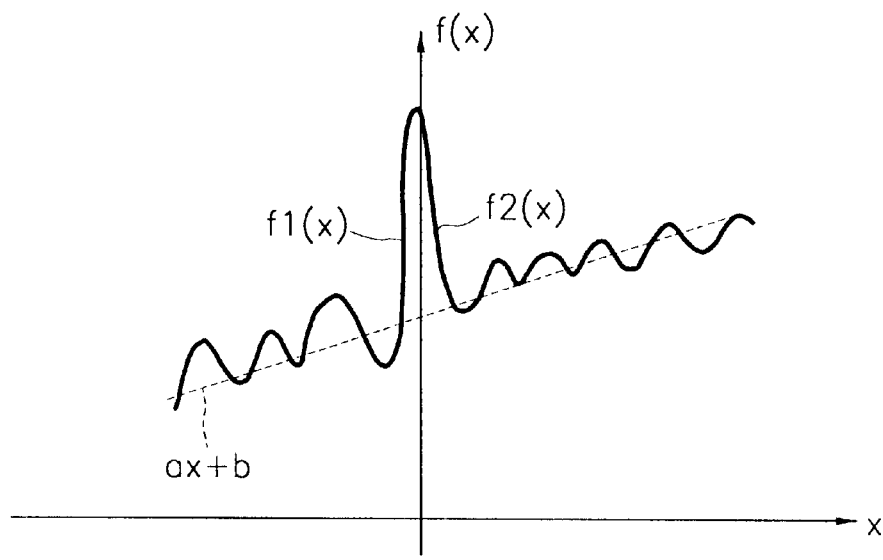
FIG. 3 shows one example of wave-pattern in order to describe in detail a method for measuring light absorption spectra in accordance with the present invention.

FIG. 3 shows one example of wave pattern in order to describe in detail a method for measuring light absorption spectra in accordance with the present invention.

The wave pattern as shown in FIG. 3 can be represented as an asymmetrical real number function f(x). The periodically changed parts have a sin function component or a cos function component. A linear function, ax+b, is included in the inclined part.

Table 1 below shows a real function to be subjected to Fourier transform and a function obtained by Fourier transform. The real function before Fourier transform is represented as f(x), and the Fourier transformed function is represented as F(v). That is, Fourier transform is conducted with respect to a real function f(x) to provide a function F(v), and an inverse Fourier transform is conducted with respect to a function F(v) to provide a real function f(x).

[Table 1]

| f(x) | F(v) |
|---|---|
| real.asymmetry | Hermitian function |
| real.even function | real.even function |
| $\sin 2\pi v_o \chi$ | $i/2[\delta(v + v_o) - \delta(v - v_o)]$ |
| $\cos 2\pi v_o \chi$ | $1/2[\delta(v + v_o) - \delta(v - v_o)]$ |
| $a\chi + b$ | plural numbers |

The Hermitian in Table 1 means that a real part is an even function and an imaginary part is an odd function. Therefore, Fourier transform F(v) of signal f(x) is Hermitian function including a real part and an imaginary part.

As shown in FIG. 3, if a starting point is set to a wavelength showing a peak value, the absorption signal is preferably symmetrical. But an absorption signal can be asymmetrical due to a pattern of gas absorption line, an output change in semiconductor laser (a change in electrical current) and a residual AM modulation. Thus, several Fourier transforms Fs(v) of an absoption signal for eliminating a noise can be occured. The axis which vertically intersects to the wavelength axis and passes the starting point is referred to as y axis hereinafter.

By eliminating an imaginary part from Fourier transform F(v), the components of sin function and linear function ax can be eliminated, but it is considered that there is a possibility of losing a component of absorption signal.

However, when the absorption signal is asymmetrical and the imaginary part of Fourier transform is small, a large error is not occurred even if the imaginary part is eliminated. Further, by comparing a Fourier transformed noise signal, an imaginary part produced by asymmetry of absorption signal can be identified. Accordingly, the absorption signal can be completely reproduced.

(2) Synthesis Method

Hereinafter, a synthesis method is described. In the direct method described above, a data processing is somewhat complicated due to the production of the imaginary part. Fourier transform of an even function is an effective method. As shown in FIG. 3, the signal function f(x) can be divided at the starting point and represented as two functions $f_1(x)$ and $f_2(x)$, as shown in the following formula I:

$$f(x) = \begin{cases} f_1(x) & (x \leq 0) \\ f_2(x) & (x > 0) \end{cases} \quad \text{[Formula I]}$$

If each of mirror images of $f_1(x)$ and $f_2(x)$ at the axis y in FIG. 3 as a symmetrical axis is taken, the functions g(x) and h(x) shown in the following formula II are formed:

$$g(x) = \begin{cases} f_1(x) & (x \leq 0) \\ f_1(-x) & (x > 0) \end{cases} \quad \text{[Formula II]}$$

$$h(x) = \begin{cases} f_2(-x) & (x \leq 0) \\ f_2(x) & (x > 0) \end{cases}$$

These functions g(x) and h(x) are even functions, respectively. The original function f(x) can be reproduced as a combination of function g(x) and function h(x). After Fourier transforms of g(x) and h(x) are conducted, a noise component is eliminated in a spectral space. The functions g'(x) and h'(x) having a little of noise can be reproduced by an inverse Fourier transform. Finally, an absorption signal is synthesised by $f_1'(x)$ and $f_2'(x)$ shown in the following formula III:

$$g'(x) = \begin{cases} f_1'(x) & (x \leq 0) \\ f_1'(-x) & (x > 0) \end{cases} \quad \text{[Formula III]}$$

$$h'(x) = \begin{cases} f_2'(-x) & (x \leq 0) \\ f_2'(x) & (x > 0) \end{cases}$$

The function synthesis process can be explained by the principal of Fourier transform.

Hereinafter, the method and apparatus for measuring a light absorption spectra is explained with reference to example.

EXAMPLE

Nitrogen and hydrogen chloride were introduced in the sample gas cell 14 of the apparatus shown in FIG. 1 to measure a concentration of hydrogen chloride in the nitrogen.

FIG. 4 shows a measurement result of the concentration of the hydrogen chloride in the nitrogen. FIG. 4(a) shows a measurement result when hydrogen chloride was not introduced; FIG. 4(b) shows a measurement result when hydrogen chloride was introduced at the concentration of 1 ppm; FIG. 4(c) shows a measurement result when hydrogen chloride was introduced at the concentration of 10 ppm; and FIG. 4(d) shows a measurement result when hydrogen chloride was introduced at the concentration of 100 ppm.

In FIG. 4, the horizontal axis corresponds to a wavelength of the semiconductor laser, and the vertical axis corresponds to an intensity of a measured second differential signal. As shown in FIG. 4(a), a periodic change and an irregular noise component due to a fringe noise were shown even when hydrogen chloride was not included.

When the concentration of hydrogen chloride was 1 ppm, an absorption signal was hidden in noise signals, and the absorption intensity could not be identified, as shown in FIG. 4(b). Data processing was conducted on these data.

(1) Direct Method

FIG. 5 shows a real part and an imaginary part of Fourier transform of the measurement result when hydrogen chloride is not introduced.

The real part and the imaginary part have large components near the frequency $2\pi v + \pm 40$. These are considered to be resulted from a sin component and a cos component (delta function) having a high frequency. Further, the Fourier component having a high frequency is resulted from high degree of sin and cos components.

FIG. 6 shows Fourier transform of the measurement signal from which a certain frequency component is removed when hydrogen chloride concentration is 1 ppm. FIG. 6(a) shows a Fourier transformed signal from which the frequency component $|2\pi v|=25\sim50$ is removed; FIG. 6(b) shows a Fourier transformed signal from which the frequency component $|2\pi v|=25\sim125$ is removed; FIG. 6(c) shows a Fourier-transformed signal from which the frequency component $|2\pi v|>25$ is removed; and FIG. 6(d) shows a Fourier transformed signal from which the frequency component $|2\pi v|>25$ and the component of an imaginary part are removed.

Referring to FIGS. 6(a)~(c), a noise is lowered by removing a Fourier component having a high frequency component, and the absorption signal becomes clear. Further, if a component of the imaginary part is removed, the reproduced signal becomes symmetrical and a component of linear function is removed.

When compared to the data processed according to a conventional shifting equilibrium method which is indicated by symbol AV in FIG. 6(c), the wave pattern shown in FIG. 6(c) is in consistent with the wave pattern by a shifting equilibrium method, and thus there occurs no error.

However, in FIG. 6(d), the curve pattern was a little changed. It is considered that an absorption signal component is removed with the elimination of an imaginary part component.

In view of the above, when a measurement result is processed, there is need to pay an attention in processing data of imaginary part.

(2) Synthesis Method

FIG. 7 shows a signal synthesized after removing frequency $|2\pi v|>25$ component from the above mentioned functions g(x) and h(x) when the concentration of hydrogen chloride is 1 ppm. Since g(x) and h(x) are even functions, the imaginary part of Fourier transforms of them is zero.

The signal synthesized as shown in FIG. 7 is identical with the signal of FIG. 6(b) obtained from the direct method.

From the above results, in the laser spectra, a fringe noise which causes the most severe problem can be solved by Fourier processing method according to the invention. Since fringe noises are depend upon systems, a frequency component to be removed should be properly selected. There is no need to pay much attention on minimization of fringe noises when constructing a system, because the noises can be removed according to the invention. Thus, construction of a system including a setting of light channel is simplified. The previous strict requirements on the window structure of the sample gas cell such as non-reflection coating or Brewster angle can be relaxed.

One embodiment of the present invention was specifically described above. In the above embodiment, a measurement method using a second differential signal was described, but an absorption signal can be measured according to the present invention irrespective of a second differential signal an d a first differential signal.

EFFECT OF THE INVENTION

As set forth above, according to the present invention, since only a signal resulted from a periodic vibration component is removed in a Fourier space, only a periodic interference component can be effectively removed without substantially losing information of an original signal.

In the conventional method, if a laser output is increased, the intensities of both the signal and the interference components were concurrently increased. Thus, there was a need to find an optimum laser output upon which the largest ratio of signal to noise (S/N ratio) is obtained. However, the optimum laser output was relatively low, and thus, the advantage of the laser method that intensity of a light source is strong was not useful.

According to the present invention, a measurement light power can be increased due to effective elimination of light interference fringe. As a result, a high sensitivity of measurement is available.

Further, in the conventional method, when a laser monitor is equipped with an apparatus for manufacturing a semiconductor, a light introducing window can not be established at Brewster angle with respect to the light axis at many cases. By this reason, a large interference is incurred and a detection sensitivity cannot be increased. According to the present invention, however, a high sensitivity of measurement is available without using a Brewster window.

Although the present invention has been fully described by way of example with reference to the accompanying drawings, it is to be understood that various changes and modifications will be apparent to those skilled in the art. Therefore, unless otherwise such changes and modifications depart from thee scope of the present invention, they should be construed as being included therein.

What is claimed is:

1. A method for measuring a light absorption spectra comprising the steps of:

(i) conducting a Fourier Transform of an absorption spectra measured by using a laser beam source to provide a Fourier transformed signal wherein the Fourier transform comprises describing said absorption spectra measured as an even function and an odd function for which a peak position of said absorption spectra forms a symmetrical axis and conducting Fourier transform on the even function and the odd function;

(ii) disassembling in a Fourier space the Fourier transformed signal into a signal resulted from a periodic vibration component and a signal resulted from a molecular absorption spectra;

(iii) removing the Fourier component resulted from said periodic vibration component in a Fourier space; and (iv) conducting an inverse Fourier transform on the signal from which said periodic vibration component is removed, whereby reproducing an absorption spectra in a real space.

2. A method of measuring a light absorptions according to claim 1, further comprising;

the step of measuring quantitatively a concentration based on a peak intensity of the absorption spectra in said reproduced real space.

3. An apparatus for measuring a light absorption spectra providing an absorption spectra from which Fourier components resulted from periodic vibration components are removed comprising:

(i) a laser beam source providing an absorption spectra:

(ii) a means for conducting a Fourier transform of the absorption spectra including describing said absorption spectra measured as an even function and an odd function for which a peak position of said absorption spectra forms a symmetrical axis and conducting Fourier transform on the even function and the odd function;

(iii) a means for disassembling in a Fourier space the Fourier transformed signal into a signal resulted from a periodic vibration component and a signal resulted from a molecular absorption spectra;

(iv) a means for removing the Fourier component resulted from said periodic vibration component in a Fourier space; and (v) a means for conducting an inverse Fourier transform on the signal from which said periodic vibration comport is removed, whereby reproducing an absorption spectra in a real space.

* * * * *